US005932643A

United States Patent [19]

[11] Patent Number: 5,932,643

[45] Date of Patent: Aug. 3, 1999

Kenny

[54] THERMAL TRANSFER RIBBON WITH CONDUCTIVE POLYMERS

[75] Inventor: Frank J. Kenny, Centerville, Ohio

[73] Assignee: NCR Corporation, Dayton, Ohio

[21] Appl. No.: 08/840,096

[22] Filed: Apr. 11, 1997

[51] Int. Cl.[6] .......... C08L 91/00

[52] U.S. Cl. .......... 524/276; 524/275; 524/277; 524/487; 524/488; 524/489

[58] Field of Search .......... 524/275, 276, 524/277, 478, 479, 480, 487, 488, 489

[56] References Cited

U.S. PATENT DOCUMENTS

| | | | |
|---|---|---|---|
| 3,663,278 | 5/1972 | Blose et al. | 524/33 |
| 3,933,509 | 1/1976 | Noguchi et al. | 430/280.1 |
| 4,229,903 | 10/1980 | Morrison et al. | 446/190 |
| 4,315,643 | 2/1982 | Tokunaga et al. | 428/213 |
| 4,320,170 | 3/1982 | Findlay | 428/336 |
| 4,403,224 | 9/1983 | Wirnowski | 346/135.1 |
| 4,519,939 | 5/1985 | Hocker et al. | 544/388 |
| 4,519,940 | 5/1985 | Schroeder et al. | 528/363 |
| 4,579,679 | 4/1986 | Papir | 528/183 |
| 4,585,730 | 4/1986 | Cho | 430/527 |
| 4,687,701 | 8/1987 | Knirsch et al. | 428/216 |
| 4,698,268 | 10/1987 | Ueyama | 428/195 |
| 4,707,395 | 11/1987 | Ueyama et al. | 428/212 |
| 4,722,853 | 2/1988 | Batliwalla | 252/511 |
| 4,777,079 | 10/1988 | Nagamoto et al. | 428/212 |
| 4,778,729 | 10/1988 | Mizobuchi | 428/484 |
| 4,916,011 | 4/1990 | Miller | 428/341 |
| 4,923,749 | 5/1990 | Talvalkar | 428/341 |
| 4,983,446 | 1/1991 | Taniguchi et al. | 428/216 |
| 4,988,563 | 1/1991 | Wehr | 428/341 |
| 5,079,130 | 1/1992 | Derkits, Jr. | 430/321 |
| 5,079,136 | 1/1992 | Tachibana et al. | 428/411.1 |
| 5,081,100 | 1/1992 | Matsushita et al. | 428/195 |
| 5,098,822 | 3/1992 | Tachibana et al. | 525/54.24 |
| 5,104,731 | 4/1992 | Gager | 428/323 |
| 5,128,308 | 7/1992 | Talvalkar | 427/152 |
| 5,198,296 | 3/1993 | Suzuki et al. | 428/336 |
| 5,240,781 | 8/1993 | Obata et al. | 428/488.4 |
| 5,248,652 | 9/1993 | Talvalkar | 503/201 |
| 5,260,127 | 11/1993 | Umise et al. | 428/327 |
| 5,278,016 | 1/1994 | Fuller et al. | 430/109 |
| 5,312,704 | 5/1994 | Fuller et al. | 430/45 |
| 5,348,348 | 9/1994 | Hanada et al. | 283/91 |
| 5,364,723 | 11/1994 | Georges et al. | 430/110 |
| 5,417,164 | 5/1995 | Nishida et al. | 156/240 |
| 5,418,089 | 5/1995 | Chaloner-Gill et al. | 429/191 |
| 5,536,613 | 7/1996 | Chang et al. | 523/206 |
| 5,686,184 | 11/1997 | Akamatu et al. | 428/411.1 |

OTHER PUBLICATIONS

WPI Abstract Accession No. 96–481211 & JP 8244367 (FUJICOPIAN) Sep. 24, 1996.

Gordon Graff, "Polymeric Antistats Find More Use in Electronics Packaging", Modern Plastics, Aug. 1996, pp. 28–29. (Best available copy).

Internet publication by Ormecon "Polyaniline (Pani ORMECON)".

Internet publication by BCC, "P–136 Electroactive Polymers: New surge of Interest in the 1990s".

*Primary Examiner*—Peter A. Szekely
*Attorney, Agent, or Firm*—Millen White Zelano & Branigan

[57] ABSTRACT

There is provided by the present invention coating formulations and thermal transfer ribbons that form printed images which contain conductive polymers. These formulations and ribbons also employ wax, polymer resin, a sensible material and, optionally solvent. Printers which employ such thermal transfer ribbons are also provided.

8 Claims, 1 Drawing Sheet

THERMAL TRANSFER RIBBON WITH CONDUCTIVE POLYMERS

FIELD OF THE INVENTION

The present invention relates to thermal transfer printing wherein images are formed on a receiving substrate by heating extremely precise areas of a print ribbon with thin film resistors. This heating of the localized area causes transfer of ink or other sensible material from the ribbon to the receiving substrate. The sensible material is typically a pigment or dye which can be detected optically or magnetically.

More particularly, the present invention is directed to thermal transfer media which exhibit reduced static levels within thermal transfer printers through the use of conductive polymers in the ink formulation.

BACKGROUND OF THE INVENTION

Thermal transfer printing has displaced impact printing in many applications due to advantages such as the relatively low noise levels which are attained during the printing operation. Thermal transfer printing is widely used in special applications such as in the printing of machine readable bar codes and magnetic alpha-numeric characters. The thermal transfer process provides great flexibility in generating images and allows for broad variations in style, size and color of the printed image. Representative documentation in the area of thermal transfer formulations and thermal transfer media used in thermal transfer printing includes the following patents.

U.S. Pat. No. 3,663,278, issued to J. H. Blose et al. on May 16, 1972, discloses a thermal transfer medium having a coating composition of cellulosic polymer, thermoplastic resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,687,701, issued to K. Knirsch et al. on Aug. 18, 1987, discloses a heat sensitive inked element using a blend of thermoplastic resins and waxes.

U.S. Pat. No. 4,698,268, issued to S. Ueyama on Oct. 6, 1987, discloses a heat resistant substrate and a heat-sensitive transferring ink layer. An overcoat layer may be formed on the ink layer.

Others include: U.S. Pat. No. 4,707,395; U.S. Pat. No. 4,777,079; U.S. Pat. No. 4,923,749; U.S. Pat. No. 4,988,563; U.S. Pat. No. 5,128,308; and U.S. Pat. No. 5,240,781.

A common feature in these thermal transfer media is the use of a substrate for the ink to be transferred. Polyethylene terephthalate (PET) films are preferred substrates in that the property profile for PET (heat resistance, tensile strength, etc.) is well suited for use in conventional thermal transfer printers. One characteristic of most polymeric films, including PET films, is the generation of static electricity when rolls of these films are unwound. It has been discovered that static electricity from the thermal transfer ribbon can be a source of premature print head wear through static-electrostatic discharge. Therefore, reducing the static level of thermal transfer ribbons is desirable. Adding conductive fillers to non-conductive polymeric materials is known to reduce the static levels of such materials. However, adding such conductive fillers to polyethylene terephthalate is not always possible, particularly where obtained from another source and, furthermore, adding such conductive fillers may detract from the desirable properties of PET film.

The use of separate anti-static layers on films for photographic materials has been disclosed in U.S. Pat. No. 4,916,011. Similar configurations have also been disclosed in U.S. Pat. Nos. 5,079,130 and 5,098,822. These anti-static layers comprise conductive polymers which show a high bonding strength to the substrate. Such a configuration is not advantageous in preparing thermal transfer ribbons in that it requires another coating procedure and may also detract from the desired properties of polyethylene terephthalate during the thermal transfer process. Depending on the position of the anti-static layer (top or bottom), it may either interfere with separation of the ink from the substrate during transfer or affect print head wear.

Employing conductive pigments in the thermal transfer layer of the thermal transfer medium has been found to reduce static levels. However, such conductive fillers may add color to the thermal transfer layer. This may limit the use of such conductive fillers to dark colored ink such as black. It is desirable to reduce the static levels of thermal transfer ribbons without requiring the use of conductive fillers within the thermal transfer layer.

Conductive polymers, i.e., inherently dissipative polymers which do not require conductive fillers, have been found to be suitable replacements for polymers with electroconductive fillers (powdered carbon, powdered nickel, metal particles and the like) for cathodes of electrolytic cells, where the primary function is conductivity. However, conductivity is not the primary function of thermal transfer layers.

SUMMARY OF THE INVENTION

It is an object of the present invention to provide a thermal transfer medium with reduced static levels.

It is another object of the present invention to provide a thermal transfer medium which exhibits reduced static levels without the use of conductive fillers.

It is an additional object of the present invention to provide a thermal transfer ribbon with a non-black thermal transfer layer which exhibits reduced static levels.

It is a further object of the present invention to provide a coating formulation with conductive polymers in an amount sufficient to provide thermal transfer layers with reduced static levels.

It is yet a further object of this invention to provide a thermal transfer medium with a non-black thermal transfer layer which contains sufficient conductive polymer to reduce static levels.

It is still another object of the present invention to provide a thermal transfer printer used in combination with a thermal transfer medium of this invention.

These and other objects and advantages of the present invention will become apparent and further understood from the detailed description and claims which follow, together with the annexed drawings.

The above objects are achieved through the use of conductive polymers within coating formulations and thermal transfer layers of thermal transfer media.

There is provided by this invention a coating formulation with conductive polymer binder resins which forms thermal transfer layers for thermal transfer media. These thermal transfer media exhibit reduced static levels when in use. This coating formulation comprises a binder, preferably comprising a wax and polymer resin, a sensible material and optionally an organic solvent or water. At least a portion of the binder comprises a conductive polymer. The amount of conductive polymer is sufficient to reduce the static levels of the thermal transfer medium when in use.

The coating formulation preferably forms images which are colorless or a color other than black. The wax and polymer resin, including the conductive polymer, are preferably sufficiently compatible such that the polymer resin does not separate from a solution, dispersion or emulsion which contains the binder components. In addition, the wax and polymer resin, including the conductive polymer, preferably have similar softening points so as to easily transfer from the flexible substrate to the receiving substrate upon exposure to a print head of a thermal transfer printer. The wax can be water dispersible or emulsifiable in water or organic solvent. Similarly, the polymer resin, including the conductive polymer, can be soluble, dispersible or emulsifiable in water or organic solvent.

In another aspect of the present invention, there is provided a thermal transfer medium which transfers images to a receiving substrate when exposed to the print head of a thermal transfer printer. This thermal transfer medium comprises a flexible substrate with a thermal transfer layer positioned thereon, said thermal transfer layer comprising a sensible material, a binder for said sensible material, preferably comprising wax and polymer resin, and, optionally, residual organic solvent or water. At least a portion of the polymer resin comprises a conductive polymer in an amount sufficient to reduce static levels when in use.

A further aspect of the present invention is the thermal transfer printer used in combination with a thermal transfer ribbon. The ribbon has a thermal transfer layer which contains a conductive polymer in an amount sufficient to reduce the static levels of the thermal transfer medium when in use.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
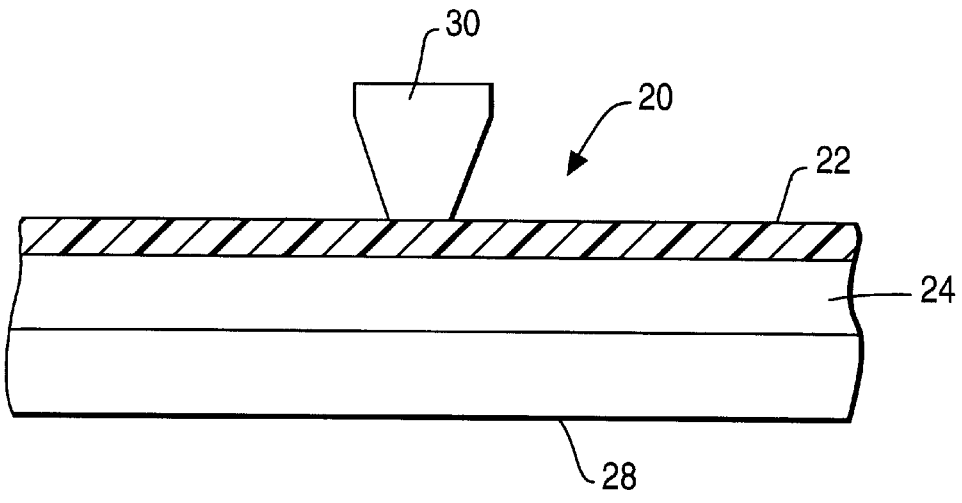
FIG. 1 illustrates a thermal transfer medium of the present invention in a printing operation prior to thermal transfer.

The coating formulation of this invention can comprise components employed in conventional coating formulations such as a sensible material, one or more waxes as a binder component, one or more polymer resins as a binder component and, optionally, one or more organic solvents or water. However, at least a portion of the polymer resin employed as a binder is a conductive polymer.

Suitable conductive polymers include polypyrolle, polyacetylene, polyazene, polyaniline, polyphenylene, polythiophene, poly-N-vinylcarbazole, polyvinylpyridine and polyindole.

The water-soluble conductive polymers include a polymer having at least one conductive moiety selected from the group consisting of —$SO_3M$ groups, —$OSO_3M$ groups, in which M is a hydrogen atom or a cation, a quaternary ammonium salt group and a tertiary ammonium salt group. Each of these groups is preferably required to be not less than 5% by weight of the polymer. The molecular weight of these polymers ranges from 3,000–100,000 and preferably from 3,500 to 50,000. Examples of such water soluble conductive polymer compounds comprise monomer units encompassed by formula I below and include those particularly described in U.S. Pat. No. 5,079,136.

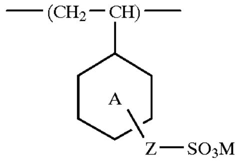

M=Na, K or Li,

A=phenylene or pyridine,

Z=direct bond, $CH_2$ or $CH_2O$.

Also included with such polymers are copolymers of the sodium salt of styrene sulfonic acid and maleic acid in a 3:1 molar ratio as described in U.S. Pat. No. 4,916,011. Other examples of conductive polymers include those in oxidized form, such as:

polyacetylene $[(\text{—CH=CH—})_n\oplus]mX_{m\_}$, where n is an integer from 10–5,000, m is an integer between 1 and about 1,000.

polyazene $[(\text{—N=CR}_1\text{—CR}_2\text{=N—})_n\oplus]mX_{m\_}$ where $R_1$ and $R_2$ are $C_1$–$C_6$ alkyl or alkoxy groups, polythiophene $[(\text{2,5-thiophenediyl})_n\oplus]mX_{m\_}$, polypyrolle $[(\text{2,5-pyrrolediyl})_n\oplus]mX_{m\_}$, polyphenylene $[(\text{1,4-phenylene})_n\oplus]mX_{m\_}$, wherein $X\_\_=ClO_{4\_}$, $PF_{6\_}$, $BG_{4\_}$, $AsF_{5\_}$, $I\_\_$, $I_{3\_}$ and the like.

Organic electrically conducting polymers are a class of materials known to exhibit conductivities (resistivity values) over a wide range of from about 10 to 15 orders of magnitude from the near insulator state of unmodified organic polymers (about $10^{18}$ ohms/in$^2$ resistivity) to the highly conducting metallic state of about $1\times10^2$ ohms/in$^2$. Resistivity values have typically ranged from $1\times10^9$ to $1\times10^{13}$ ohms/in$^2$ for most conductive polymers as measured by conventional methods such as the method described in U.S. Pat. No. 4,585,730, issued to Cho. However, recent developments have provided polymers with lower resistivity values.

Typically, conducting polymers are produced in the non-conductive form and doped with either oxidizing agents or reducing agents to activate the conductive properties. Organic polymer materials are reacted with electron donor or acceptor molecules to modify their room temperature electrical conductivity. The donors can modify the organic polymeric materials so they exhibit semi-conducting and metallic room temperature electrical conductivity. The method for doping polyacetylene is more particularly described in U.S. Pat. No. 4,229,903. Similar procedures are described for poly-P-phenylene, polypyrrole, polyphenylenevinylene in U.S. Pat. Nos. 4,519,939; 4,519,940; and 4,579,679. Dopants can either induce electron denoting behavior by reducing the polymer to a polyanion or by oxidizing the polymer to a polycation. The dopant in each case is the neutralizing cation or anion.

An alternative method is to oxidize or reduce the polymer using electrochemical techniques. Upon passing electric current through the cell, the polymers are reduced or oxidized and charge compensating cation or anionic dopants are incorporated into the polymer from the supporting electrolyte. The charges of the polymer and compensating dopant balance so that the conductive polymer is electrically neutral. The desired value for resistivity can be adjusted by controlling the level of incorporation of dopants into the polymer.

A preferred conductive polymer is polyaniline of the formula

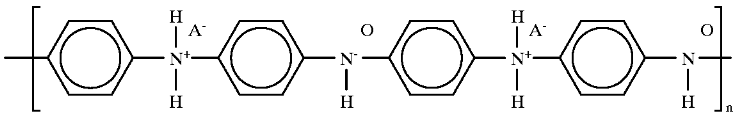

available from Zipperling, Kessler and Co. of Ahrensburg under the tradename Ormacon®. Surface-resistance is said to be adjusted from approximately 103 to 105 ohms even at 1 μm thickness. It is also said surface resistance between 101 and 109 ohms can be realized from lacquer formulations.

Another preferred conductive polymer is the elastomeric polyethers with side chains that impart conductivity sold under the tradename Stat-Rite™ by The B. F. Goodrich Co. Another preferred compound is poly(3-alkylthiophene).

The conductive polymers can be added to the coating formulation in a manner consistent with conventional methods for introducing conventional polymer resins. The amount of conductive polymer is preferably such that it provides thermal transfer media such as ribbons with reduce static levels. Such amounts can range from 0.1 wt. % to 10 wt. % of total solids of the formulation. Amounts higher than 10 wt. % are not expected to improve the performance of the thermal transfer ribbon with respect to avoiding damage to the thermal print head through electrostatic discharge. However, amounts higher than 10 wt. % conductive polymer are expected to have an impact on the properties of the resulting print. Amounts of conductive polymer below 0.1 wt. % total solids of the coating formulation typically will not have a significant effect on the conductivity of the polymer so as to reduce static levels significantly beyond those of a non-conductive polymer. While preferred levels fall within the range of 0.1 to 10 wt. %, if the conductive polymer is highly compatible with the wax and other polymer resins of the binder, levels over 20 wt. % total solids can be tolerated.

The coating formulations for this invention preferably contain wax or a resin as a main dry component which is preferably soluble, dispersible or emulsifiable in solvents for the conductive polymer, which is typically water. Similarly solubilities enhance compatibility which provides a host of advantages such ease in processing and longer shelf life.

Suitable waxes include natural waxes, such as carnauba wax, candilla wax, beeswax, rice brand wax, petroleum waxes such as paraffin wax; synthetic hydrocarbon waxes such as low molecular weight polyethylene and Fisher-Tropsch wax; higher fatty acids such as myristic acid, palmitic acid, stearic acid and behenic acid; higher aliphatic alcohols such as stearyl alcohol and esters such as sucrose fatty acid esters. Mixtures of waxes can also be used. Examples of preferred waxes are carnauba wax under the Slip-Ayd series of surface conditioners by Daniel Products Co. and low molecular weight polyethylene. These waxes provide images with high smudge resistance. The melting point of the wax typically falls within the range of from 75° C. to 250° C., preferably from 75° C. to 200° C. Waxes with melting points at the high end are advantageous in that they aid in the integrity of the printed image. The amount of wax used in the coating formulations of present invention is above 5 wt. % based on the dry ingredients, preferably 10 to 90 wt. %. The coating formulations typically comprise 20 to 55 wt. % total solids. This translates at least to 1 to 2 wt. % wax based on the total formulation. Preferred coating formulations have from 2–30 wt. % wax based on the total formulation. To aid in processing, rheology and compatibility with polymer resin binder and conductive polymer, micronized grades of wax are often preferred.

Although the coating formulations of this invention may only contain conductive polymers as the sole polymer resin, these coating formulations typically also contain a polymer resin other than a conductive polymer. As with the waxes above, these other polymer resins are preferably soluble, dispersible or emulsifiable in solvents for the conductive polymers to aid compatibility. Suitable polymer resins include thermoplastic resins used in conventional coating formulations, such as those described in U.S. Pat. Nos. 5,240,781 and 5,348,348 and the following: polyvinylchloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polystyrene, styrene copolymers, polyamide, ethylcellulose, epoxy resin, polyketone resin, terpene resin, petroleum resin, polyurethane resin, polyvinyl butyryl, styrene-butadiene rubber, nitrile rubber, acrylic rubber, ethylene-propylene rubber, styrene-alkyl (meth)acrylate copolymer, acrylic acid-ethylene-vinyl acetate terpolymer, saturated polyesters and sucrose benzoate. Suitable saturated polyesters are further described in U.S. Pat. No. 4,983,446. Preferred thermoplastic binder resins include sucrose benzoate, polyethylene, polyketone resins and styrene copolymers. The polymer resin is preferably ground to submicron size to aid solubilization, dispersion or emulsification in the formulation.

Preferred coating formulations may contain two or more polymer resins to provide specific property profiles. For example, Piccotex resins by Hercules are hydrocarbon resins (vinyl toluene-alpha methyl styrene copolymers) that provide high hot tack properties which aid adhesion of the coating to the synthetic resin receiving substrate upon transfer. Polyethylene SL 300, a polyethylene resin emulsion of a small (submicron) particle size is a surface conditioner within the Slip-Ayd series by Daniel Products which provides slip or wax-like properties for transfer. These binder resins can be used together or with other resins to provide a specific property profile.

In addition to special properties such as these, the polymer resins provide a higher melting point than the wax so that the image resulting therefrom exhibits high smear and scratch resistance and can provide higher adhesion to a substrate.

The polymer resin typically has a melting/softening point of less than 300° C. and preferably in the range of 100° C. to 250° C. To provide high scratch and smear resistant images on synthetic resin substrates, the polymer resin may comprise at least 25 wt. %, based on total dry ingredients, of the coating formulation. In preferred embodiments, the polymer resin comprises 2 wt. % to 75 wt. % of the total dry ingredients. This translates to preferred coating formulations having at least 5 wt. % to 10 wt. % polymer resin based on the weight of the total formulation, and preferred formulations having from 7 wt. % to 35 wt. % polymer resin, based on the weight of the total formulation.

The polymer resin, conductive polymer and wax are preferably compatible such that they do not separate out in dispersions or emulsions which contain 2 to 25 wt. % wax, based on the total weight of said dispersion or emulsion. Such compatibility ensures a high loading of binder resin for producing images with high scratch and smear resistance. To enhance compatibility, i.e., minimize separation, it is preferable that the binder resin, conductive polymer and wax particles be of submicron size, as discussed above.

The coating formulation of the present invention contains a sensible material (pigment) which is capable of being sensed visually, by optical means, by magnetic means, by electroconductive means or by photoelectric means. This sensible material is typically a coloring agent such as a dye or pigment but may include magnetic particles. Any coloring agent used in conventional ink ribbons is suitable, including carbon black and a variety of organic and inorganic coloring pigments and dyes. Examples include phthalocyanine dyes, fluorescent naphthalimide dyes and others such as cadmium, primrose, chrome yellow, ultra marine blue, iron oxide, cobalt oxide, nickel oxide, etc. The total amount of sensible material is typically from about 5 to 60 parts by weight of the total dry ingredients for the coating formulation. The pigment can form 1 to 20 wt. %, preferably 5 to 15 wt. % of the total dry ingredients. Preferred formulations have pigments and/or dyes of a color other than black or pigments and/or dyes which provide a latent image, i.e., a formulation which is colorless or colorless upon printing which may have a component that is activated by heat, UV radiation or a similar energy source.

The coating formulation may contain plasticizers, such as those described in U.S. Pat. No. 3,663,278, to aid in processing of the thermal transfer layer. Suitable plasticizers are adipic acid esters, phthalic acid esters, ricinoleic acid esters sebacic acid esters, succinic acid esters, chlorinated diphenyls, citrates, epoxides, glycerols, glycols, hydrocarbons, chlorinated hydrocarbons, phosphates, and the like. The plasticizer provides low temperature sensitivity and flexibility to the thermal transfer layer so as not to flake off the substrate.

The coating formulation may contain other conventional additives for thermal transfer media including flexibilizers such as oil, weatherability improvers such a UV light absorbers, fillers, surfactants and dispersants.

The coating formulations of this invention contain the above identified solids in a solution, dispersion or emulsion of either an aqueous or organic solvent. The coating formulation is preferably water-based or water-rich for environmental reasons; however, included in this invention are coating formulations wherein water is a minor portion of the total solvent or is absent. The organic solvents used are preferably miscible with water and include alkanols such as propanol. Small amounts of such organic solvents significantly enhance the stability and dispersion of these solids in aqueous formulations. Other suitable solvents include selected esters, ketones and ethers. The solids content of the coating formulation is typically within the range of 15 to 80 wt. % and more typically within the range of 20–55 wt. %. The solids content can be higher (up to 100%), such as in hot melt formulations, which do not require any solvent.

Preferred coating formulations comprise 10 to 90 wt. % wax, 40 to 75 wt. % binder resin and 0.01 to 10 wt. % conductive polymers to 5 to 35 wt. % sensible material based on the total weight of dry ingredients. A particularly preferred formulation is that containing a mixture of wax, an ethylene vinyl acetate copolymer binder resin, conductive polymer and a dye or pigment selected from photochromic dyes, photochromic pigments and colored dyes other than black as the sensible material.

The coating formulation of the present invention can be prepared in conventional equipment, such as an attritor or ball mill, or in an impeller equipped vessel, since the formulation need not be ground. The ingredients need only be combined as dispersions and mixed uniformly. The dispersions are typically about 30 wt. % solids. The wax is typically added first and the remaining components are added with minor heating. The preferred method is to mix the solvent, wax components, polymer resin and conductive polymer at an elevated temperature, preferably about 66° C. (150° F.), for about 15 minutes, after which the sensible material is added and the resulting mixture is mixed at an elevated temperature, preferably from about 60° C. (140° F.) to 66° C. (150° F.), for about two hours.

The thermal transfer medium of the present invention comprises a substrate, preferably a thin smooth paper or plastic-like material and a thermal transfer layer comprised of wax, polymer resin, conductive polymers and a sensible material. Suitable waxes, binder resins, sensible material and conductive polymers are as described above. Suitable substrate materials include tissue type paper materials such as 30–40 gauge capacitor tissue, manufactured by Glatz and polyester-type plastic materials such as 14–35 gauge polyester terephthalate (PET) film manufactured by Dupont under the trademark Mylar®. Polyethylene naphthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness and low heat resistance to prolong the life of heating elements within thermal print heads. The thickness is preferably 3 to 10 $\mu$m. If desired, the substrate or base film may be provided with a backcoating on the surface opposite the thermal transfer layer.

The thermal transfer layer is preferably obtained from the coating formulation of the present invention in the form of either a solution, dispersion or emulsion. The thermal transfer layer may contain all the additives and components suitable for the coating formulations described above. A residual solvent may be present and is dependant on the effectiveness of the drying step in forming the thermal transfer layer. Once applied to the substrate, a portion of the solvent can remain in the coating. The residual solvent is typically undesirable but it may aid in transferring the image.

The thermal transfer layer (functional layer) preferably has a softening point within the range of about 50° C. to 250° C. which enables transfer at normal print head energies which are believed to range from about 50° C. to 250° C.

The thermal transfer layers can be prepared by conventional techniques and equipment such as a Meyer Rod or like wire round doctor bar set up on a conventional coating machine to provide the coating weights described below. The coating weight of the thermal transfer layer typically ranges from 1.9 to 4.3 g/$m^2$. A temperature of about 70° C. (about 160° F.) is maintained during the entire coating process. After the coating formulation is applied, it is optionally passed through a dryer at an elevated temperature to ensure drying and adherence of the functional layer to the substrate. The thermal transfer layer can be fully transferred onto a receiving substrate such as paper or synthetic resin at a temperature in the range of 75° C. to 250° C.

The thermal transfer media of the present invention provides the advantages of thermal printing with little or no generation of static electricity. When the thermal transfer media (ribbon) is exposed to the heating elements of the thermal print head, the thermal transfer layer softens and transfers from the medium (ribbon) to the receiving substrate with the magnets therein.

Figure 2:
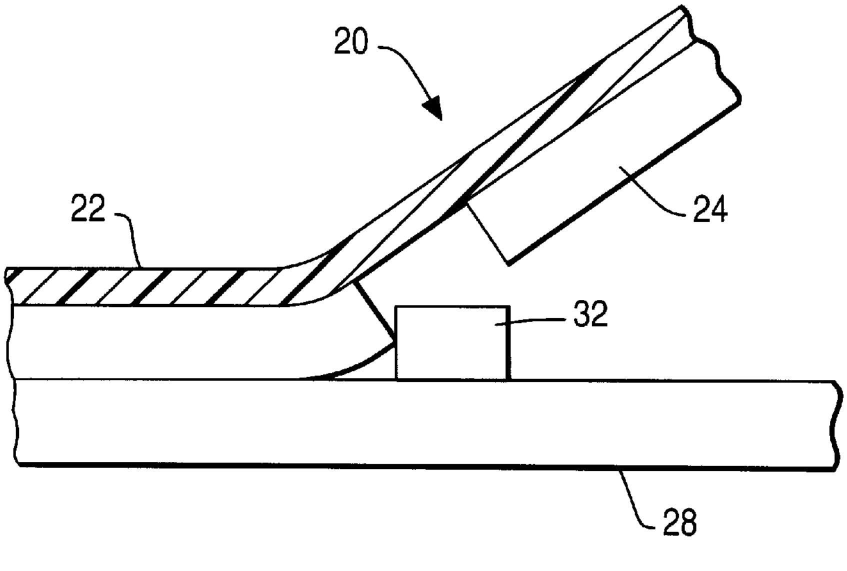
FIG. 2 illustrates a thermal transfer medium of the present invention in a printing operation after thermal transfer.

Illustrated in FIGS. 1–2, is a preferred thermal transfer ribbon 20, of this invention, which comprises substrate 22 of a flexible material which is preferably polyethylene terephthalate.

Positioned on substrate 22 is thermal transfer layer 24. The thermal sensitivity of thermal transfer layer 24 is determined by the softening point of the binder resin and wax. This thermal transfer layer has a softening point below 300° C., preferably between 50° C. and 250° C. and most preferably from 50° C. to 200° C. Softening temperatures within this range enable the thermal transfer medium to be used in conventional thermal transfer printers, which typically have print heads which operate at temperatures in the range of 50° C. to 250° C., more typically, temperatures in the range of 100° C. to 150° C. The thermal transfer layer preferably contains a wax and binder resin which are compatible so that exposure to heat from the print head uniformly transfers thermal transfer layer 24 from substrate 22 to synthetic resin receiving substrate 28 and form printed image 32.

Preferred thermal transfer media contain thermal transfer layers which comprise 10 to 95 wt. % wax, 40 to 75 wt. % binder resin, 15 to 40 wt. % sensible material and 0.1 to 10 wt. % conductive polymer.

There is provided by this invention thermal transfer printers which employ the thermal transfer media of this invention. All hardware and software for the equipment can be conventional except for the thermal transfer media of this invention employed within the printer.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, are hereby incorporated by reference.

EXAMPLES

Example 1

A coating formulation of the present invention can be prepared by adding the following ingredients in Table 1 to a quart sized vessel equipped with an impeller and mixed for about 20 minutes.

The conductive polymer comprises polyaniline sold under the tradename ORMECON® by Zipperling, Kessler & Co., dispersed within mineral spirits.

TABLE 1

| INGREDIENT | PERCENT DRY | WET AMOUNT | PREFERRED RANGE (% Dry) |
|---|---|---|---|
| Polymer Resin (Polymethylmethacrylate) | 20.0 | 50.0 | 15–40 |
| Wax (Carnauba Emulsion @ 25%) | 5.0 | 20.0 | 2–10 |
| Conductive Polymer (Polyaniline) | 5.0 | 12.5 | 1–10 |
| Wax-Resin (Polyethylene Emulsion) | 20.0 | 50.0 | 10–40 |
| Mineral Spirits | — | 167.5 | |
| Polymer resin (Sucrose Benzoate) | 50.0 | 200.0 | 40–70 |
| Total | 100.0 | 500.0 | Final Solids 20% |

Preparation of a Thermal Transfer Ribbon and Image

The formulation of Example 1 can be coated on 18 gauge polyester film at about a 1.9–4.3 g/$m^2$ coat weight and dried at about 70° C. to obtain a thermal transfer ribbon of the present invention. This ribbon is well suited for printing bar codes at a temperature in the range of 110° C.–150° C. using a TEC B-30 thermal transfer printer at +2V setting.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A coating formulation which provides thermal transfer layers for thermal transfer media with softening characteristics which enables transfer to a receiving substrate when exposed to the print head of a thermal transfer printer, wherein said coating formulation comprises a solvent comprising water, a sensible material and a binder comprising wax and polymer resin, wherein at least a portion of the polymer resin comprises a conductive polymer and wherein said coating formulation comprises an aqueous solution, dispersion or emulsion of said wax, polymer resin and sensible material.

2. A coating formulation as in claim 1 which provides a thermal transfer layer with a resistivity below $1 \times 10^{18}$ OHM/in$^2$.

3. A coating formulation as in claim 2 which provides a thermal transfer layer with a resistivity of from $1 \times 10^2$ to $1 \times 10^{13}$ OHM/in$^2$.

4. A coating formulation as in claim 1, wherein the conducting polymer is selected from the group consisting of polyvinylpyridine, polyaniline, polypyrolle, polyacetylene, poly-N-vinylcarbazole, polyindole, polyphenylene, polythiophene and polyazene.

5. A coating formulation as in claim 1 which contains 0.1 to 10 wt. % conductive polymers based on total solids.

6. A coating formulation which provides thermal transfer layers for thermal transfer media with softening characteristics which enable transfer to a receiving substrate when exposed to the print head of a thermal transfer printer, wherein:

(a) said coating formulation comprises a sensible material, a binder comprising wax and polymer resin, and a solvent;

(b) a portion of the polymer resin comprises a conductive polymer in an amount of from 0.1 to 10 wt. % of the total solids, and (c) said coating formulation is free of conductive fillers and has a resistivity below $1\times10^{18}$ ohm/in$^2$, wherein the conductive polymer is polyaniline.

7. A coating formulation as in claim 6, wherein the coating formulation is free of carbon black and provides a non-black colored thermal transfer layer.

8. A coating formulation as in claim 7, wherein the coating formulation is colorless and provides a colorless thermal transfer layer.

* * * * *